United States Patent [19]

Crump

[11] Patent Number: 4,912,796

[45] Date of Patent: Apr. 3, 1990

[54] ADJUSTABLE HEIGHT WHEELCHAIR RAMP WITH SUPPORTING LEGS

[76] Inventor: Robert Crump, 333 Guthrie Rd., Louisville, Ky. 40202

[21] Appl. No.: 296,610

[22] Filed: Jan. 13, 1989

[51] Int. Cl.4 .............................................. E01D 15/12
[52] U.S. Cl. .................................. 14/69.5; 238/10 R; 14/71.1
[58] Field of Search ....................... 14/69.5, 71.1, 72.5; 238/10 R; 193/38, 41

[56] References Cited

U.S. PATENT DOCUMENTS

| 3,580,373 | 5/1971 | Stickle | 14/71.1 X |
| 4,065,825 | 1/1978 | Cohen | 14/72.5 |
| 4,528,711 | 7/1985 | Packer | 14/69.5 |

Primary Examiner—William P. Neuder
Attorney, Agent, or Firm—Scott R. Cox
Porta-Ramp Brochure updated

[57] ABSTRACT

This invention discloses a new, novel and unique adjustable height wheelchair ramp with supporting legs comprised of a pair of ramps, each end of each ramp containing a ramp end section and attached to each ramp is a height adjustment and supporting mechanism to support the ramps when in use. This height adjustment and supporting mechanism is comprised of a first and second leg and a foot which supports the ramps when they are in use.

In conventional wheelchair ramps, especially where long distances are being spanned by the ramps, conventional ramps will tend to deflect resulting in a dangerous condition for the individual using the ramp and also limiting the life and utility of the ramp. By use of the height adjustment ramp support of the adjustable height, wheelchair ramp with supporting legs the ramp can be used for a large range of heights while still providing a stable, secure, relatively light wheelchair ramp system.

17 Claims, 2 Drawing Sheets

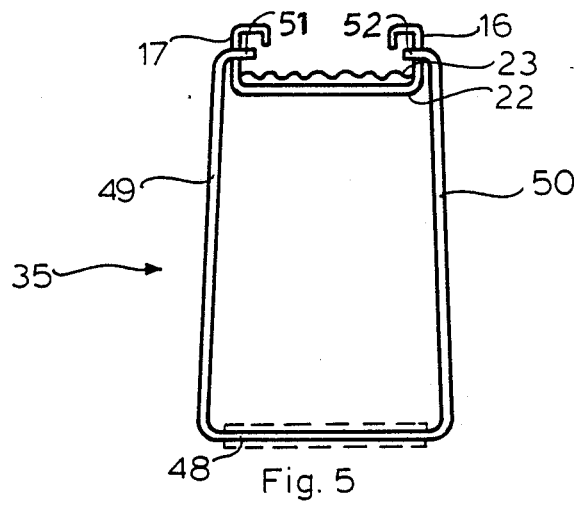
Fig. 5
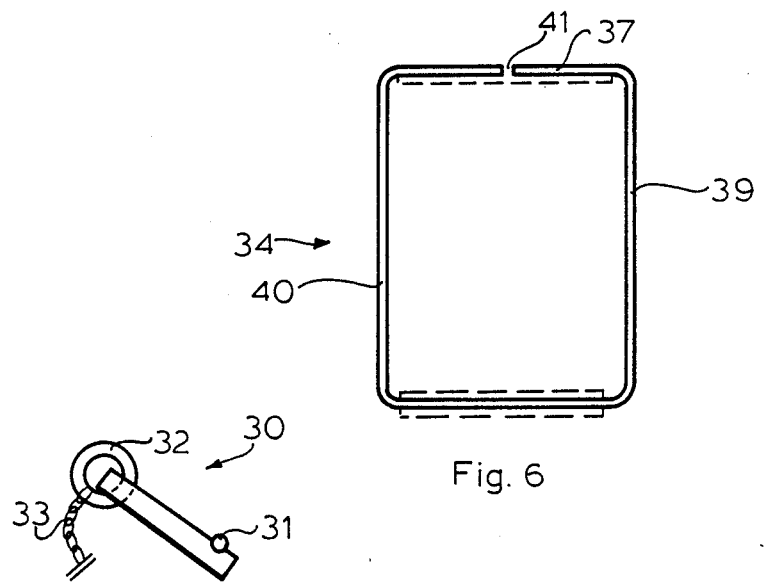
Fig. 6
Fig. 8
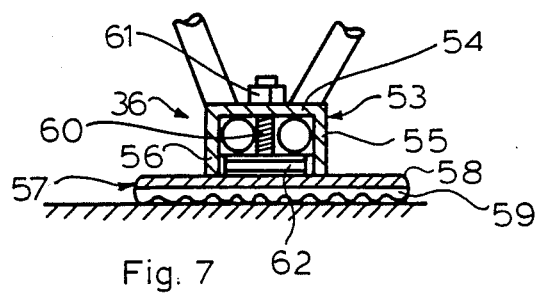
Fig. 7

ADJUSTABLE HEIGHT WHEELCHAIR RAMP WITH SUPPORTING LEGS

BACKGROUND OF INVENTION

1. Field of Invention

This invention relates to ramps. In particular, this invention relates to wheelchair ramps wherein an adjustable supporting means is attached to the ramps to support them at a variety of heights.

2. Prior Art

Conventional wheelchair ramps are essentially of two types. The first type is a pair of generally "C" shaped ramps, each of which is generally comprised of two or three sections for descending relatively small heights, such as with one or two steps. The second general type of ramp is a one piece ramp designed for use where the drop is also relatively short. These types of ramps are disclosed, for example, in the publication titled "Porta-Ramp" produced by Crump Products, Inc.

Although both of these types of ramps serve important functions, there are many situations where a different, more adaptable ramp should be useful. For example, if the height of drop from the top of the surface to the landing area is too great, relatively short ramps, i.e., about six feet or less, are not practical since a person in a wheelchair using the ramp may travel down the ramp at too great a speed and risk falling.

To overcome this deficiency, ramps of greater length are needed. This lengthening of the ramps, however, creates additional problems. If the same type of material is used for construction of the lengthened ramps as is commonly used in conventional ramps, these lengthened ramps will bend while in use resulting in an increased likelihood of an accident. Further, such stress on the ramps will greatly reduce the useful life of the ramp.

One method of lessening this problem would be to increase the strength and thickness of the ramp material so that it could support the weight of an individual in a wheelchair over a distance of eight feet or more. However, such an increase in thickness creates additional problems, not the least of which are the increase in price of the product and the dramatic increase in the weight of the ramp, thus making the product not practical.

If conventional one piece ramps are increased in length, similar problems will also occur. To allow the individual in the wheelchair to safely negotiate an increased length of drop, the ramp would have to be lengthened which would greatly increase its weight. If, in the alternative, lighter materials are used to reduce the weight of the ramp and make it more practical, the ramp would tend to bend or buckle when in use.

Therefore, it is an object of this invention to provide a wheelchair ramp which will allow for safe passage by an individual in a wheelchair over relatively long distances.

It is another object of this invention to provide a wheelchair ramp which is supported by supporting legs which can be adjusted to various heights depending on the angle of the incline.

It is a still further object of this invention to provide a wheelchair ramp which will allow for a safe ascent or descent by an individual in a wheelchair from a relatively great height.

It is a still further object of this invention to provide a safe, reliable, adjustable height wheelchair ramp which is not heavy and which can be easily stored.

These and other objects and features of the present invention will become apparent to those skilled in the art from a consideration of the following detailed description, drawings and claims. A description along with the accompanying drawings provides a selected example of construction of the device to illustrate the invention.

SUMMARY OF INVENTION

In accordance with the present invention there is provided an adjustable height wheelchair ramp with supporting legs system comprising:
(a) a pair of ramps, each ramp comprised of a bottom and two sides wherein each side contains a plurality of adjustment openings, and wherein each ramp is composed of a plurality of telescoping sections;
(b) attached to the end of each ramp is a ramp end section; and
(c) attached to each ramp is a height adjustment mechanism comprised of the first and second leg and a generally flat foot, wherein said first leg is secured to the bottom of the ramp and to the foot and wherein said second leg is secured to the foot and contains leg hooks which fit in the adjustment openings of the ramp.

This adjustable height, wheelchair ramp with supporting legs provides a safe, reliable means for individuals in wheelchairs to negotiate heights which is greater than that permitted by conventional wheelchair ramps. It allows for longer, less steep slopes, thus making it easier to push persons in wheelchairs up the ramp. Because of its unique mechanical construction, it permits the safe passage from heights significantly greater than permitted by conventional wheelchair ramps without increasing the weight of the ramp. Further, by use of the adjustable supporting mechanism, problems with deflection or bending of the ramp while in use are greatly reduced.

BRIEF DESCRIPTION OF THE DRAWINGS

This invention will now be described with reference to the accompanying drawings in which:

FIG. 5 is a front view of the ramp showing the first leg connected to the ramp.

FIG. 6 is a front view of the second leg.

FIG. 7 is a side view of the foot with attached first and second legs.

FIG. 8 is a side view of the hitch pin.

DETAILED DESCRIPTION OF PREFERRED EMBODIMENT

Figure 1:
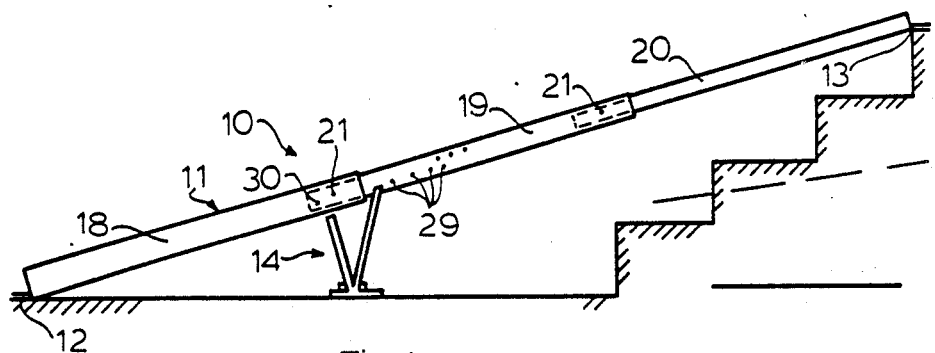
FIG. 1 is a right side view of the adjustable height, wheelchair ramp with supporting legs.

Although the invention is adaptable to a wide variety of uses, it is shown in the drawing for the purposes of illustration as embodied in an adjustable height, wheelchair ramp with supporting legs system (10) comprised of a pair of ramps (11, only one is shown), ramp end sections (12, 13) one of which is attached to each end of each ramp and a height adjustment and supporting mechanism (14) which is attached to the bottom (15) of each ramp.

Figure 2:
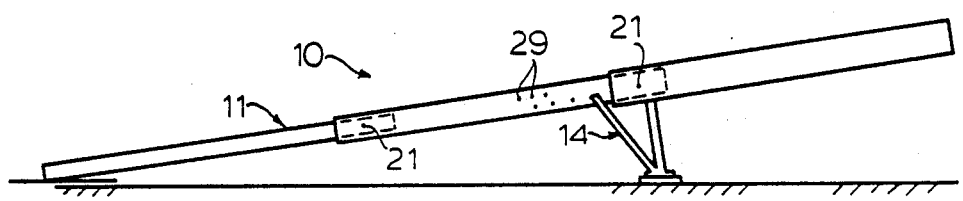
FIG. 2 is a left side view of the adjustable height, wheelchair ramp with supporting legs.

The ramps are generally conventionally "C" shaped channel ramps containing a bottom (15) and two sides (16, 17) made as shown in the Porta-Ramp brochure. They are comprised of a plurality of telescoping sections, preferably three sections (18, 19, 20), which can telescope partially or fully to make a ramp ranging in length from about 3 to about 10 feet. When the sections of the ramp are extended, they are held securely in their extended position by any conventional locking mechanism such as a bullet catch lock (21). See FIGS. 1 and 2. Other conventional means for holding the ramps in their extended position are also acceptable.

The inner bottom surface (22) of each ramp is provided with a slip resistant, rubber-like material containing ridges (23) running the length of the ramp to provide traction when the ramp is in use. The ramps themselves are made from any conventional high-strength, low-weight material such as high-strength aluminum.

Figure 3:
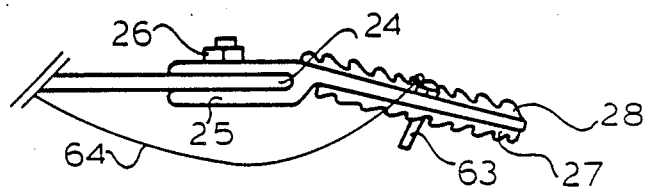
FIG. 3 is a cutaway side view of the ramp end sections connected to the ramp.
Figure 4:
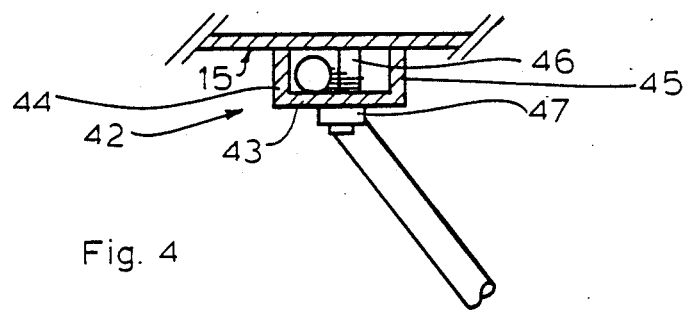
FIG. 4 is a cutaway view of the attachment of the first leg to the bottom of the ramp.

To assist in ingress and egress from the ramp, secured to each end of each ramp is a ramp end section (12, 13). Although these ramp end sections can be manufactured as part of the overall ramp, in a preferred embodiment, they are removable from the ramp. The ramp end sections are generally one piece construction with a portion angled upward approximately 10 to 30 degrees. See FIG. 3. By being removable, these ramp end sections can be reversed to provide different angles of incline of the ramp when it is in use. In one preferred embodiment the end (24) of the ramp end section is C-shaped and slips over the end of the ramp. The ramp end sections are secured to the ramp by any conventional securing means such as a bolt (25) and nut (26) running through the end of the ramp and the C-shaped end of the ramp end section. See FIG. 3. Both the top and the bottom of the surface of the ramp end section are provided with ramp end slip resistent pads (27, 28), preferably vinyl or rubber, to prevent slippage of the individual in the wheelchair when entering and leaving the ramp.

As previously stated, in a preferred embodiment the ramp is comprised of three telescoping sections. The second of those sections will have a plurality of adjustment openings (29) in its sides, see FIGS. 1 and 2, for use with the height adjustment and supporting mechanism. The number of adjustment openings will vary depending on the desire of the manufacturer. In a preferred embodiment from about 8 to about 12 openings, each spaced 1¼" apart are provided. The operation of the openings will be discussed in more detail later.

When the ramp sections are extended, each section overlaps the succeeding section. See FIGS. 1 and 2. To assure that the first (18) and second sections (19) do not pull apart when in use, in a preferred embodiment, a conventional hitch pin (30) is secured in place into the overlapping portion of the first and second sections. See FIG. 1. The hitch pin can be of any conventional construction and, preferably, has a retractable ball (31) in one end that allows the pin to be inserted in a pair of openings, one in each section, which line up as the first and second sections overlap. See FIG. 8. The opposite end of the hitch pin has an attachment means for attaching it to the overlapping sections, such as a chain (33) with a hook loop (32) which runs through the hitch pin.

Secured to the bottom of each of the ramps is a height adjustment and supporting mechanism (14) for supporting the ramps when in use. This adjustment and supporting mechanism is comprised of a first (34) and second leg (35) and a foot (36) which acts in cooperation with the legs to provide for the height adjustment and support of the wheelchair ramps. See FIGS. 4, 5, 6 and 7.

The first leg (34) of the height adjustment and supporting mechanism is a metal rod, preferably of about ¼" in diameter, made of a sturdy metal such as steel formed into a generally rectangular shape comprised of shorter top (37) and bottom (38) sections and longer side sections (39, 40) with an opening (41) in the top section for attachment to the bottom of the ramp. See FIG. 6.

Securing this first leg to the ramp is accomplished by means of a bottom ramp support channel (42) which is secured across the bottom of one of the sections of the ramp, preferably the widest section. See FIG. 4. The bottom ramp support channel is generally C-shaped in cross section with a bottom (43) and two sides (44, 45) and is roughly the same width as is the ramp. The top side (37) of the first leg is placed within the bottom ramp support channel (42) and then the bottom ramp support channel is secured to the ramp by any conventional securing means, such as a bolt (46) running through the bottom of the ramp and through the bottom ramp support channel which is held in place by a nut (47). See FIG. 4.

The second leg (35) of the height adjustment and supporting mechanism (14) is a metal rod similar in construction to the first leg, formed into an upturned generally C-shaped member comprised of a bottom section (48) and two arm sections (49, 50). On the end of each arm of the C-shaped second leg and an integral part of the second leg are leg hooks (51, 52) which extend about ¼" to about 1¼" inward and toward each other. See FIG. 5. These leg hooks are insertable inside the adjustment openings (29) in the sides of the ramp for adjusting the height of the height adjustment and supporting mechanism as will be discussed in more detail later. The bottom section (48) of the C-shaped second leg is secured within the foot (36) of the height adjustment and supporting mechanism. See FIG. 7. When the height adjustment and supporting mechanism is not in use, it is secured against the bottom of the ramp.

The foot (36) of the height adjustment and supporting mechanism is comprised of a C-shaped foot channel (53) with a top (54) and side sections (55, 56), said foot channel being similar in construction and shape to the bottom ramp support channel (42), and a generally rectangular flat bottom section (57). See FIG. 7. The flat bottom section (57) is comprised of two portions, the first being a generally flat rectangular metal piece (58) and the second being a generally rectangular foot slip resistant pad (59), generally of the same construction as the ramp end slip resistant pads (27, 28) secured to the ramp end sections (12, 13). This foot slip resistant pad limits the movement of the foot when secured in place.

The bottom section of both the first leg (38) and the second leg (48) are secured within the foot channel (53) and then the foot channel is secured to the flat bottom section (57) of the foot. The foot channel (53) is secured to the flat bottom section (57) by conventional securing means similar to that used to secure the bottom ramp support channel to the ramp and, preferably, the securing means is a bolt (60) and nut (61) combination. It is important that the bottom sections of both legs be allowed to rotate around the axis of the bottom sections within the foot channel for height adjustment purposes.

In a preferred embodiment, placed between the bottom sections of the first and second leg and the top of the flat bottom section of the foot is a means for slightly adjusting the height of the leg when the ramp is in use. In a preferred embodiment this means is a flat spring (62). The spring is compressed when weight is placed on the ramp. This weight on the ramp results in the bottom portions of each leg pressing down on the spring. This slight compression allows for a more secure and stable support for the ramp. See FIG. 7.

Secured to each end of each ramp is a means for locking the ramps in place. In a preferred embodiment a ramp end locking pin (63) secured by a chain (64) or other securing means functions as the locking means. The locking pin and chain are of similar construction to the hitch pin (30) previously discussed. This locking pin passes through the ramp end section (12, 13) and will lock the ramp in whatever location is needed such as on a step or the inside lip of a vehicle if a corresponding opening is provided for insertion of the pin.

In operation the adjustable height wheelchair ramp with supporting legs system (10) when not in use is compressed. In use the telescoping sections (18, 19, 20) of the ramp (11) are extended and locked into place by a locking mechanism such as bullet catch locks (21). A hitch pin (30) is secured in the overlap of the first and second sections of the ramp to prevent an unexpected extension of the ramp sections. The ramp is placed where it will be used and the appropriate side of the ramp end sections (12, 13) is secured to the end of the ramp. If appropriate a locking pin (63) is secured at the end of the ramp to prevent undesired movement of the wheelchair ramp when in use.

The height adjustment and supporting mechanism (14) is then adjusted to support the ramp at an appropriate height. The leg hooks (51, 52) of the second leg (35) are placed in the appropriate adjustment opening (29) in the ramp making sure that the ramp is securely supported by the legs.

The largest section of the ramp may be placed at the bottom nearest the lowest or the highest portion of the height to be traversed thus maximizing flexibility of the ramp. See FIGS. 1 and 2.

I claim:

1. An adjustable height wheelchair ramp with supporting legs system comprising:
   (a) a pair of ramps each containing a bottom and two sides, wherein each side contains a plurality of adjustment openings and wherein each ramp is composed of a plurality of telescoping sections;
   (b) attached to each end of each ramp is a ramp end section; and
   (c) attached to each ramp is a height adjustment mechanism comprised of a first and second leg and a generally flat foot wherein said first leg is secured to the bottom of the ramp and to the foot and wherein said second leg is secured to the foot and contains leg hooks which are insertable in the adjustment openings of the ramp.

2. An adjustable height wheelchair ramp with supporting legs system comprising:
   (a) a pair of ramps each containing a bottom and two sides wherein each side contains a plurality of adjustment openings and wherein each ramp is comprised of a plurality of telescoping sections;
   (b) attached to each end of each ramp is a removable ramp end section; and
   (c) attached to each ramp is a height adjustment mechanism comprised of a first and second leg and a generally flat foot wherein said first leg is comprised of a bottom section secured to the foot, two side sections and a top portion which are secured to the bottom of the ramp and wherein the second leg is an upturned, generally C-shaped member comprised of a bottom section secured to the foot, two arm sections and two leg hook members secured to the arm sections which are insertable in the adjustment openings in the ramp.

3. The adjustable height wheelchair ramp with supporting legs system of claim 1 wherein the ramps are comprised of three telescoping sections.

4. The adjustable height wheelchair ramp with supporting legs system of claim 1 wherein the ramp end sections can be reversed.

5. The adjustable height wheelchair ramp with supporting legs system of claim 1 wherein the ramps are manufactured from high strength aluminum.

6. The adjustable height wheelchair ramp with supporting legs system of claim 1 wherein the foot is comprised of a foot channel secured to a flat bottom section wherein said flat bottom section is comprised of a generally flat, rectangular metal piece and a foot slip resistant pad secured to said metal piece.

7. The adjustable height wheelchair ramp with supporting legs system of claim 1 wherein there is provided a pin secured to the ramp on a chain.

8. The adjustable height wheelchair ramp with supporting legs system of claim 1 wherein the ramps are secured in their open position by bullet catch locks.

9. The adjustable height wheelchair ramp with supporting legs system of claim 1 wherein the top portion of the first leg is secured to the bottom of the ramp by placing it within a bottom channel which is secured to the bottom of the ramp.

10. The adjustable height wheelchair ramp with supporting legs system of claim 2 wherein the ramps are comprised of three telescoping sections.

11. The adjustable height wheelchair ramp with supporting legs system of claim 2 wherein the ramp end sections can be reversed.

12. The adjustable height wheelchair ramp with supporting legs system of claim 2 wherein the ramps are manufactured from high strength aluminum.

13. The adjustable height wheelchair ramp with supporting legs system of claim 2 wherein the foot is comprised of a foot channel secured to a flat bottom section wherein said flat bottom section is comprised of a generally flat, rectangular metal piece and a foot slip resistant pad secured to said metal piece.

14. The adjustable height wheelchair ramp with supporting legs system of claim 2 wherein there is provided a pin secured to the ramp on a chain.

15. The adjustable height wheelchair ramp with supporting legs system of claim 2 wherein the ramps are secured in their open position by bullet catch locks.

16. An adjustable height wheelchair ramp with supporting legs system comprising:
   (a) a pair of ramps each containing a bottom and two sides, wherein each side contains a plurality of adjustment openings and wherein each ramp is composed of a plurality of telescoping sections;
   (b) attached to each end of each ramp is a ramp end section; and
   (c) attached to each ramp is a height adjustment mechanism comprised of a first and second leg and a generally flat foot wherein said first leg is secured to the bottom of the ramp and to the foot, wherein said second leg is secured to the foot and contains leg hooks which are insertable in the adjustment openings of the ramp, wherein the foot is comprised of a foot channel secured to a flat bottom section wherein said flat bottom section is comprised of a generally flat, rectangular metal piece and a foot slip resistant pad secured to said metal piece, and wherein there is provided a flat spring within the foot channel.

17. An adjustable height wheelchair ramp with supporting legs system comprising:
   (a) a pair of ramps each containing a bottom and two sides wherein each side contains a plurality of adjustment openings and wherein each ramp is comprised of a plurality of telescoping sections;
   (b) attached to each end of each ramp is a removable ramp end section; and
   (c) attached to each ramp is a height adjustment mechanism comprised of a first and second leg and a generally flat foot wherein said first leg is comprised of a bottom section secured to the foot, two side sections and a top portion which are secured to the bottom of the ramp, wherein the second leg is an upturned, generally C-shaped member comprised of a bottom section secured to the foot, two arm sections and two leg hook members secured to the arm sections which are insertable in the adjustment openings in the ramp, wherein the foot is comprised of a foot channel secured to a flat bottom section wherein said flat bottom section is comprised of a generally flat, rectangular metal piece and a foot slip resistant pad secured to said metal piece, and wherein there is provided a flat spring within the foot channel.

* * * * *